United States Patent Office 3,222,255
Patented Dec. 7, 1965

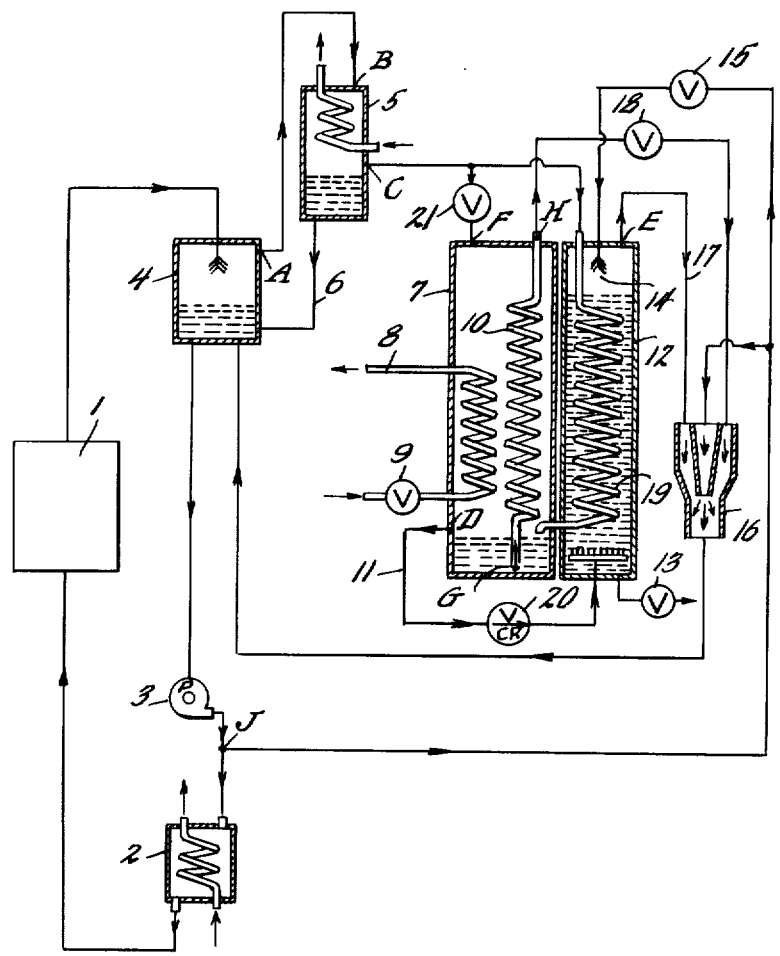
INVENTOR
Pierre E. J. M. Maldague,
BY Hugo E. Weisberger
ATTORNEY

3,222,255
METHOD OF PURIFYING PRIMARY FLUID OF NUCLEAR REACTOR CIRCUIT
Pierre Edmond Jules Marie Maldague, Brussels, Belgium, assignor to Société Anglo-Belge Vulcain, Société Anonyme, Brussels, Belgium
Filed Aug. 2, 1963, Ser. No. 299,494
Claims priority, application Luxembourg, Aug. 11, 1962, 42,208
7 Claims. (Cl. 176—37)

This invention relates to nuclear reactors in which through at least one circuit a fluid flows which is wholly or in part in a liquid state in at least part of its circuit. The fluid may be of any nature and its purpose may for instance be that of a coolant, and/or a moderator, and/or a reflector, and/or a regulating fluid, and/or an intermediary fluid for the transfer of heat. Such list however is not restrictive.

The present invention relates to a process and to a device for the partial or total extraction of one or several substances in solution and/or suspension in the said liquid(s).

The said substances may be of any nature and more particularly they may be impurities, corrosion products, or soluble poisons.

The invention may apply separately to fluid(s) passing through each or through certain circuits when the reactor comprises several circuits which do not have any common part, nor any point of communication between them.

For the clearness of the description, the process and device according to the invention is described hereinafter as being applied to a fluid passing through one of the above said circuits, when the said circuit forms an enclosure with a substantially constant volume; the said enclosure may be formed by a chamber, or by several chambers connected with each other in any manner whatever.

It is however clear that the invention may also be used when the above said circuit forms an enclosure having a variable volume, or even when the circuit is open. For the clearness of the description, the said fluid will be called hereinafter "primary fluid"; however, the use of that expression should not be interpreted in a restrictive way.

The nuclear reactor according to the present invention is characterized in that it comprises means for ensuring the purification of the primary fluid by distillation of a fraction derived from the latter, at a total pressure which is substantially equal to that which is present in the primary circuit.

It is known that in the nuclear reactors, the difference of pressure between the two points respectively at the highest pressure and at the lowest pressure of the primary circuit, is generally small, since it is limited to the sum of head losses in the above said circuit. The difference of temperatures of saturation of the primary fluid in liquid state corresponding to the said difference of pressure is therefore also small. If the temperature of the primary fluid at the hottest point is lower than, or equal to the temperature of saturation of the primary liquid at the point where the pressure is lowest, in order to distil primary liquid at the point of minimum pressure and "a fortiori" at other points, it is necessary to dispose of an auxiliary source of heat which may bring the liquid to be distilled to its saturation temperature at the pressure available at the point(s) considered.

If the temperature of the primary fluid at the hottest point is higher than the temperature of saturation at the point of minimum pressure, it may be possible in principle to distil a fraction derived from the primary liquid at the point of said minimum pressure, by bringing it to its temperature of saturation inside a heat exchanger through the hot branch of which a primary fluid passes, which is branched off at the said hottest point.

However, the difference of temperature between the branches, hot and cold, of the said heat exchanger would be very small, and the distillation of a comparatively important fraction of the primary fluid above mentioned would require the use of very large surfaces of thermal exchange.

In a first mode of carrying the invention into effect, the fraction derived from the primary liquid is brought into a distillation apparatus belonging to auxiliary circuits of the reactor, where it is evaporated at least in part by heating it at a temperature higher than its temperature of saturation. The substances which are not carried over with the vapour of the primary liquid become concentrated inside the distillation apparatus where they are extracted in a continuous manner or periodically. During the extraction, the said substances may be accompanied by a suitable amount of the primary liquid contained in the distillation apparatus.

The heating of the liquid contained in the distillation apparatus is effected by means of heating elements. The latter may be heated by any known means. They may comprise for instance electric resistances, or tubes through which flows a heating fluid the temperature of which is higher than the temperature of saturation of the primary liquid. The heating elements may also comprise materials which are heated by gamma radiation emitted by the core, or elements of nuclear fuel, placed in the distillation apparatus and exposed to a flux of neutrons coming from the core.

The vapour produced in the distillation apparatus may be re-introduced into the primary circuit, at a point where the pressure is equal to, or slightly lower than that available at the outlet from the distillation apparatus.

In a second mode of carrying the invention into effect, the distillation of a suitable fraction of the primary fluid under the conditions of pressure above mentioned (pressure substantially equal to that of the primary circuit), is effected without the necessity of using an auxiliary source of heat, and without the necessity of having very large surfaces for the thermal exchange.

According to this second mode of carrying the invention into effect, a gas or a mixture of gases is used for the distillation as an agent of extraction and transport of the vapour of the primary fluid.

To that end, the evaporation of the liquid to be distilled is produced in a mixture gas-vapour at a total pressure which is substantially equal to that available in the primary circuit, but in which mixture the partial pressure of vapour is sufficiently lower than the total pressure to make it possible to distil the above said liquid at temperatures lower than the maximum temperature of the primary fluid in the circuit considered. The difference between the said total pressure and partial pressure of vapour is equal to the partial pressure of the gas in the mixture gas-vapour.

In the reactor according to the second mode of carrying the invention into effect, the circuit of the primary fluid comprises one or several chambers. This chamber, or each of these chambers, may for instance be an outer tank belonging to the circuit, but it may also be arranged inside the reactor vessel, when a reactor having a vessel is being considered. In this chamber or these chambers, the liquid phase of the primary fluid is placed in contact in any suitable manner with a mixture of its vapour and one or several gases, in such a manner that the mixture gas-vapour shall be substantially maintained at the pressure of the primary circuit in which the distillation is carried out. The partial pressure of vapour at any point of the circuit of this mixture is substantially that of saturation at the temperature of the mixture; the said partial pressure is low at the low temperatures and is high at the high temperatures. At any point of the circuit of the mixture the partial pressure of the gas is equal to the difference between the total pressure of the mixture and the partial pressure of the vapour; it is therefore low at the high temperatures and high at the low temperatures.

According to the present invention, from the above said chamber(s) a suitable amount of the mixture gas-vapour is extracted by any known means and is cooled by any known means up to a temperature $T_1$ such that the vapour contained in the above said mixture shall be partially, or substantially entirely, condensed. The gas(es) partially or substantially entirely separated from the vapour, is (are) introduced at that temperature $T_1$ into the enclosure(s) containing the liquid to be distilled which is maintained at an average temperature $T_2$, higher than $T_1$, by causing it to pass through the cold branch of the exchanger, through the hot branch of which a suitable amount derived from the primary fluid flows at an average temperature higher than $T_2$.

The mixture gas-vapour placed in intimate contact, by any known means, with the liquid to be distilled, becomes progressively charged with an increasing amount of vapour, until the partial pressure of vapour has reached a value lower than, or substantially equal to the pressure of saturation at the temperature of the liquid to be distilled.

The mixture gas-vapour which escapes after that operation, is afterwards brought to one or several points P of the primary circuit or of a derivation of the latter, where the pressure is equal to, or slightly lower than that available at the outlet of the enclosure or enclosures containing the liquid to be distilled. At that or those points P, the mixture gas-vapour joins the primary fluid. From the point or points P the mixture follows the circuit of the primary fluid or of one of its branches. That point or points of junction P is (are) chosen so that at that point or points, the pressure of the primary fluid shall be lower than the maximum pressure available in the primary circuit. The natural or forced flow of the primary fluid brings afterwards the mixture gas-vapour and the primary fluid into a chamber (chambers) in which the total pressure is higher than at the point(s) of junction P above mentioned. An amount such of the mixture gas-vapour is extracted from the said chamber(s) (by any known means) that the amount of gas extracted shall correspond to that introduced at the point(s) of junction P. The mixture gas-vapour is cooled at the temperaure $T_1$ and is sent into the enclosure(s) of distillation above mentioned. The circuit is thus completed.

The material(s) contained in solution and/or in suspension in the liquid which has been introduced into the distillation apparatus (apparatuses) become accumulated, after evaporation of the said liquid, inside one or several spaces of the said distillation apparatus (apparatuses), and may be blown off periodically or continuously.

The said temperatures $T_1$ and $T_2$ may be constant or variable. The amount of gas in the mixture gas-vapour(s) may also be constant or variable.

The above indications describe the invention in its most general form and it is possible to deduct numerous particular modes of realisation therefrom.

Means are provided for regulating, at least partially, the amount of purification of the primary fluid.

Such means may be capable of acting upon the amount of distilled vapour.

According to the first mode of carrying the invention into effect, the regulation of the amount of distilled primary liquid may be effected by varying the heat evolved by the heating elements in any known manner.

According to the second mode of carrying the invention into effect, the said regulation may be effected by providing at least one device permitting to modify the amount of the mixture gas-vapour inside the distillation apparatus.

The said amount may be modified by regulating for instance by means of a valve, the amount of gas, and/or the temperature of the mixture gas-vapour before its admission into the distillation apparatus, and/or the average temperature in the latter apparatus.

Through the heat-exchanger(s) associated with the circuit of mixture gas-vapour(s) above mentioned primary fluid may flow, the amount and/or temperature of which is (are) constant or adjustable in any known manner. Through one or several other heat exchangers associated with the circuit of the mixture gas-vapour(s) above mentioned secondary fluid may flow, the amount and/or temperature of which is (are) constant or adjustable in any known manner. One or several of the above mentioned heat exchangers may be of the regenerative type.

The receptacle in which the distillation is carried out, may be of any known form. In the second mode of carrying the invention into effect it may for instance consist of a distillation column or a chamber in which the mixture gas-vapour(s) flows in a counter-current direction to a fine dispersion of the liquid(s) to be distilled, or also a chamber in which the mixture gas-vapour bubbles into the liquid to be distilled.

If no particular regulating device has been provided, the process and device according to the present invention allow of extracting in a continuous manner the material(s) contained in solution and/or suspension in the primary fluid(s), at a constant rate for each condition of normal working, but which may be different from one normal condition to another, according to the particular characteristics of the reactor and of the apparatus used for the extraction.

If it is desired to regulate in a predetermined manner the rate of extraction of the above said material(s), use may be made of one or several of the above said regulating means. For instance, it is possible to modify the said temperature $T_1$ by acting upon the opening of an adjustable valve which controls the output of cooling fluid into one of the said exchangers the purpose of which is to lower the temperature of the mixture gas-vapour(s) before introducing the latter into the distillation apparatus(es). An increase of the amount of cooling fluid by means of a regulating valve facilitates the condensation of the vapour(s) of the mixture gas-vapour(s) passing through the exchanger. The mixture gas-vapour(s) entering the above said distillation apparatus(es) contains therefore a smaller fraction of vapour(s) and, for a constant amount of the mixture gas-vapour(s), it removes at the outlet from the distillation apparatus(es) a more important amount of vapour(s) of the liquid subjected to evaporisation inside the distillation column(s). The amount of distilled liquid and therefore the rate of extraction of the extracted material(s) of the primary liquid(s) is increased.

A decrease of the amount of cooling fluid would produce by a mechanism similar to that above described, a decrease of the above rate of extraction.

At least one of the said regulating devices may be automatically acted upon from indications from one or several measuring apparatus of any nature, which may for instance be ohmmeters, salinometers, pH meters, thermocouples, etc.

In a reactor according to the present invention, the purification may therefore be effected in an entirely automatic manner and require a simple, not cumbersome regulating system.

In a reactor according to the present invention it is possible to carry the purification of the primary fluid(s) of the reactor into effect in a more advantageous manner than those used of known hitherto (demineralization by ion exchange, distillation at a pressure different from that of the primary circuit).

By comparison with the classical process of demineralisation by branching off a fraction of the primary fluid through a circuit comprising an exchanger (or exchangers), possibly a valve (or valves) of expansion, and pump(s) for replacing under pressure, as well as demineralizers such as ion exchangers, the process according to the present invention has the advantage of avoiding all the apparatus above mentioned which are costly and cumbersome, and of which a part, for instance resins or other substances used as ion exchangers, must be replaced or regenerated periodically.

By comparison with the known process of purification by distillation at an appreciably lower pressure than that of the primary circuit, the process and device according to the present invention offer the advantage of avoiding the expansion valve(s) and pump(s) for replacing the liquid and the gases freed during the expansion under pressure.

By way of example, not at all restrictive, the process and the device according to the present invention have been described as being applied to a spectral shift reactor with pressurized water.

The essential characteristic features of the reactor considered are the following:
- the reactor is moderated, cooled, and if necessary reflected by means of a mixture of heavy water and light water, called hereinafter "primary fluid";
- the nuclear fuel consists of pellets of uranium oxide of low enrichment in uranium 235 and/or in plutonium, piled inside tubes of stainless steel, zirconium, or any other suitable material;
- the primary fluid leaves the core at the upper part thereof and passes through a pressurizing chamber filled with a mixture of hydrogen and water vapour. The entire primary circuit is placed in the vessel of the reactor including the exchangers and the pumps. The motors of the latter are fixed to the lid of the vessel;
- the total pressure of the primary fluid at the outlet from the core is higher than, or equal to the pressure of saturation at the outlet from the hottest channel(s) at nominal power, under the most unfavourable conditions appearing during the life of the core;
- the numerical data of normal working are the following, calculated upon the basis of a primary fluid composed substantially of pure heavy water:

Nominal power _____ 65 Mwt.
Output of primary fluid _____ 730 kg./s.
For full power (nominal power):
  Average temperature of the primary fluid
    at the entrance of the core _____ 291.5° C.
  Average temperature of the primary fluid
    inside the core _____ 300.0° C.
  Average temperature of the primary fluid
    at the outlet from the core _____ 308.5° C.
  Temperature of the primary fluid at the
    outlet from the hot channel _____ 317° C.
  Nominal volume occupied by the mixture
    vapour-gas in the pressurising chamber _____ 600 liters.
  Nominal total pressure inside the pressurizing chamber _____ 114.0 ata.
  Nominal partial pressure of the gas inside
    the pressurizing chamber _____ 12.3 ata.
  Nominal partial pressure of vapour in the
    pressurizing chamber _____ 101.7 ata.

The principle of the device applied to the above reactor is given by way of a non-restrictive example in the accompanying drawing, in which:

1 shows the core of the reactor;
2 shows a primary/secondary exchanger;
3 shows a pump for the flow of the primary fluid;
4 shows a chamber in the primary fluid, containing a mixture gas-vapour, and through which primary water flows;
5 shows a primary/secondary heat-exchanger in which a first partial condensation of vapour takes place;
6 shows a line bringing by gravity the water which has been condensed in the exchanger 5 towards the chamber 4;
7 shows a heat-exchanger in which vapour containing in a portion of the mixture gas-vapour extracted from the exchanger 5, is condensed;
8 shows the cooling circuit of the exchanger 7;
9 shows a regulating valve arranged in the circuit 8;
10 shows a cold branch of the heat-exchanger 7; through which the condensed water collected inside this exchanger, flows; this condensed water is taken at the point G, is re-heated in the said branch 10 of the heat-exchanger and passes afterwards from the point H to an ejector 16 (several ejectors may be provided);
11 shows a line through which the mixture gas-vapour passes afterwards;
12 shows a distillation apparatus;
13 shows a blow-off valve arranged at the bottom of the distillation apparatus 12;
14 shows a spraying nozzle at the upper part of the distillation apparatus 12;
15 shows a valve actuated by the water level in the distillation apparatus;
16 shows an ejector through which flows a fraction derived from the primary circuit;
17 shows a line bringing the mixture gas-vapour from the point E at the upper part of the distillation apparatus 14 to the ejector 16;
18 shows a valve actuated by the water level inside the heat-exchanger 7;
19 shows a coil for heating the distillation apparatus 12 and through which part of the mixture gas-vapour extracted from 5, flows;
20 shows a check valve arranged in the line 11;
21 shows a regulating valve.

In the example given, the device is used in such a manner as to spend a fraction of power as small as possible in the whole of the circuits and apparatus used for the purification of the primary water.

The amount of the mixture gas-vapour in the branch AB of the circuit from the region 4 up to the exchanger 5 is 50,000 liters/hour. The mixture contains 51.7 grs. of vapour and 0.63 gr. of hydrogen per liter. Its temperature at B is 306° C. The exchanger is arranged at a higher level than that of the chamber 4.

The mixture is cooled in the exchanger 5 by the secondary fluid to 289° C., thus producing a condensation of 1730 kgs. of water/hour. Such water at 289° C. falls by gravity towards the chamber 4 through the line 6.

The mixture gas-vapour leaves the heat-exchanger 5 at C. with an output of 20,700 liters/hour; it contains 39.1 grs. water and 1.52 grs. hydrogen per liter. The mixture passes in parallel through the heat-exchanger 7 into which it enters at F where its output is of 6,800 liters/hour and through the heating coil 19, and is cooled up to 100° C. (temperature $T_1$ above mentioned), thus producing a condensation of 806 kgs. of water/hour.

The condensate is collected at the lower part of the heat-exchanger 7 and is taken at the point G in the cold branch 10 where it is reheated up to 279° C. at its outlet from the heat-exchanger at H. Such water is drawn towards the ejector 16 and is re-admitted into the primary circuit at 4. The regulating valve 18 is actuated by the water level in the heat-exchanger 7.

The mixture gas-vapour leaves the heat-exchanger 7 at the point D; it is therefore at the temperature of 100° C. and contains 0.6 gr. of steam and 7.15 grs. of hydrogen per liter; its output at D is of 4,390 liters/hour.

Water derived from the point J of the primary circuit is introduced into the distillation apparatus 12 through a nozzle 14 at a temperature of 306° C. The water amount, that is 525 kgs./h., is calculated so that the primary water shall be purified in a suitable manner. The 525 kgs./h. of derived water are evaporated inside the distillation apparatus by means comprising the heating from the heating coil 19 and the admission of the mixture gas-vapour arriving through the line 11. This mixture is heated in 12 the distillation apparatus to 279° C. and is charged with vapour until it contains 33.2 grs. of water and 1.99 grs. of hydrogen per liter. It leaves the distillation apparatus 12 at its upper part at the point E, where its output is 15,850 liters/hour, and is introduced at 4 through the ejector 16.

The amount of water evaporated in the distillation apparatus 12 is regulated by acting upon the output of the cooling circuit of the exchanger 7 by means of the valve 9. The admission of primary water through the nozzle 14 into the distillation apparatus 12 is regulated by means of the valve 15 controlled by the water level in the apparatus 12. The amount of evaporated water may also be regulated by acting upon the output of the cooling circuit of the heat-exchanger 5, or of the line 17, or of the line AB or of the mixture extracted through F into the heat-exchanger 7.

By establishing the balance of the heat exchangers, it is ascertained that the thermal losses in the whole of the circuit of purification are established at 110,000 kcal./hour, that is 0.2% of the total thermal power of the reactor.

What I claim is:

1. Method for the purification of the primary fluid of a nuclear reactor while operating and at power wherein said fluid circulates and accumulates impurities, comprising the steps of separating a portion of said fluid from its circuit, distilling said portion at a total pressure substantially equal to the pressure prevailing in the primary fluid circuit when the reactor is at power, thereby forming vapor of said primary fluid and residual liquid concentrate containing said impurities, returning said vapor to said primary fluid circuit at said total pressure and discarding said liquid concentrate.

2. Method for the purification of the primary fluid of a nuclear reactor while operating and at power wherein said fluid circulates and accumulates impurities, comprising the steps of separating a portion of said fluid from its circuit, introducing said portion into a vaporization zone together with a non-condensible gas, evaporating said fluid portion in said zone at a total pressure substantially equal to the pressure prevailing in the primary fluid when the reactor is at power to form a gas-vapor mixture and a residual liquid concentrate containing said impurities, returning said gas-vapor mixture to said primary fluid circuit at said total pressure, and discarding said liquid concentrate.

3. The method of claim 2 in which said reactor includes an enclosure in which the primary fluid is placed in contact with a mixture of its vapor and said gas, and in which the gas-vapor mixture is removed from said enclosure and cooled by heat exchange prior to introducing it into said vaporization zone.

4. The method of claim 3 which includes regulating the rate of purification by modifying the rate of removal of said gas-vapor mixture.

5. The method of claim 3, which includes regulating the rate of purification by modifying the cooling temperature of said gas-vapor mixture.

6. The method of claim 2, which includes regulating the rate of purification by modifying the average temperature of said fraction of primary fluid inside said vaporization zone.

7. The method of claim 3, in which the primary fluid is pressurized in said enclosure.

References Cited by the Examiner

UNITED STATES PATENTS 3,041,261   6/1962   Kosmin et al. _____ 176—39

FOREIGN PATENTS 822,163   10/1959   Great Britain.

REUBEN EPSTEIN, *Primary Examiner.*

CARL D. QUARFORTH, *Examiner.*

J. V. MAY, L. DEWAYNE RUTLEDGE,
*Assistant Examiners.*